(12) United States Patent
Tanaka et al.

(10) Patent No.: US 6,579,935 B1
(45) Date of Patent: Jun. 17, 2003

(54) POLYESTER RESIN COMPOSITION

(75) Inventors: Yasuo Tanaka, Ichihara (JP); Youji Hayakawa, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/890,159

(22) PCT Filed: Jan. 29, 1999

(86) PCT No.: PCT/JP99/00378

§ 371 (c)(1),
(2), (4) Date: Jul. 27, 2001

(51) Int. Cl.$^7$ ............................. C08L 67/02; C08L 51/06
(52) U.S. Cl. .......................................... 525/64
(58) Field of Search ............................................ 525/64

(56) References Cited

U.S. PATENT DOCUMENTS 6,399,695 B1 * 6/2002 Moriwaki .................. 524/504

FOREIGN PATENT DOCUMENTS

| JP | 06206947 | * | 7/1994 |
| JP | 09041137 | * | 2/1997 |
| JP | 09087476 | * | 3/1997 |

* cited by examiner

*Primary Examiner*—Patricia A. Short
(74) *Attorney, Agent, or Firm*—Burns, Doane, Swecker & Mathis, LLP

(57) ABSTRACT

According to the present invention, a polyester resin composition superior in the impact resistance, especially low-temperature impact resistance, and in the stiffness as well as in the fracture toughness can be obtained. The polyester resin composition according to the present invention is a composition which comprises, per 100 parts by weight of a polyester resin (A), 5–200 parts by weight of a graft-modified ethylene/α-olefin random copolymer (B) obtained by grafting onto an ethylene/α-olefin random copolymer (B-1) composed of ethylene unit and of an α-olefin unit of 6–20 carbon atoms an unsaturated carboxylic acid or its derivative (B-2), wherein the grafting amount of the unsaturated carboxylic acid or its derivative (B-2) is 0.01–10% by weight and wherein the said ethylene/α-olefin random copolymer (B-1) before being graft-modified has (a) a content of the α-olefin unit of 6–20 carbon atoms of 6–25 mole % and (b) a melt flow rate (ASTM D 1238, 190° C., 2.16 kg load) of 0.1–50 g/10 min.

2 Claims, No Drawings

POLYESTER RESIN COMPOSITION

FIELD OF THE INVENTION

The present invention relates to a polyester resin composition in which a graft-modified ethylene/α-olefin random copolymer is compounded.

BACKGROUND OF THE INVENTION

Thermoplastic polyester resins, such as polyethylene terephthalate, polybutylene terephthalate and so on, have been used as engineering plastics due to their superior performances in, for example, mechanical strength, stiffness, heat resistance, resistance to chemicals and resistance to oils, and have found applications for, for example, machine parts, parts for electric devices and appliances and parts for automobile.

While such thermoplastic polyester ersins as polyethylene terephthalate etc. are certainly superior in the properties as given above, they are inferior in the impact resistance as compared with polycarbonate resin and so on and, thus, may sometimes be limited in the field of application thereof. For this reason, attempts have been made to improve the impact resistance.

For example, Japanese Patent Publication Sho 46-5225 B discloses a polyester resin composition in which a polyester is blended with ethylene/propylene rubber, polyisobutene or polybutene etc.

However, this composition exhibits an insufficient effect of improvement in the impact resistnce, since the polyester is inferior in the compatibility with the ethylene/propylene rubber etc.

In Japanease Patent Publications Sho 57-54058 B and Sho 57-59261 B, a polyester resin composition is disclosed, in which a graft-modified ethylenic polymer having a degree of crystallinity not higher than 75% obtained by grafting an α, β-unsaturated carboxylic acid or a derivative thereof onto an ethylenic polymer is melt-blended.

However, the above polyester resin composition also exhibits insufficient effect of improvement in the impact resistance together with decreased fracture toughness. While the impact resistance may be increased by increasing the proportion of the graft-modified ethylenic polymer, this causes decrease in the stiffness.

Japanese Patent Publication Sho 59-28223 B (corresponding to U.S. Pat. No. 4,172,859) discloses a poly-ester resin composition compounded with a graft-modified ethylene/α-olefin random copolymer obtained by grafting an α, β-unsaturated carboxylic acid derivative or an unsaturated epoxide etc. onto an an ethylene/α-olefin random copolymer. Japanese Patent Kokai Sho 58-17148 A (corresponding to U.S. Pat. No. 4,461,871) discloses a polyester resin composition obtained by blending a copolymer of ethylene with a copolymer of an α-olefin and a glycidyl ester of an α, β-unsaturated acid. Japanese Patent Kokai Sho 60-28446 A discloses a polyester resin composition obtained by blending a polyepoxy compound with a graft-modified ethylene/α-olefin copolymer obtained by grafting an unsaturated carboxylic acid or anhydride thereof onto the copolymer.

These polyester resin compositions exhibit also insufficient improvement in the impact resistance and an attempt to increase the impact resistance by increasing the proportion of additive may result in a decrease in the stiffness.

DISCLOSURE OF THE INVENTION

The object of the present invention is to provide a polyester resin composition which is superior in the impact resistance, especially in the impact resistance at low temperatures (Low temperature impact resistance) together with excellencies in the stiffness and in the fracture toughness (tensile toughness).

The present invention resides in the polyester resin composition as given below:

(1) A polyester resin composition, comprising
- (A) a polyester resin and
- (B) a graft-modified ethylene/α-olefin random copolymer in which an unsaturated carboxylic acid or a derivative thereof (B-2) is grafted onto an ethylene/α-olefin random copolymer (B-1) comprising a structural unit of ethylene and a structural unit of an α-olefin of 6–20 carbon atoms, in a proportion of 5–200 parts by weight of (B) per 100 parts by weight of (A), wherein the grafted amount of the unsaturated carboxylic acid or the derivative thereof (B-2) is 0.01–10 % by weight and wherein the ethylene/α-olefin random copolymer (B-1) has, before the graft-modification, the features
- (a) that the content of the structural unit of the α-olefin of 6–20 carbon atoms is 6–25 mole % and
- (b) that the melt flow rate (ASTM D 1238, 190° C., 2.16 kg load) is 0.1–50 g/10 min.

(2) The polyester resin composition as defined in the above (1), wherein the ethylene/α-olefin random copolymer (B-1) before the graft-modification is that obtained by subjecting ethylene and the α-olefin of 6–20 carbon atoms to a random copolymerization in the presence of a catalyst based on metallocene.

(3) The polyester resin composition as defined in the above (1) or (2), wherein the ethylene/α-olefin random copolymer (B-1) is a linear ethylene/α-olefin random copolymer which has, before the graft modification, the features
- (c) that it has a glass transition temperature (Tg) of not higher than minus 50° C.,
- (d) that it has a degree of crystallinity determined by X-ray diffraction method.of lower than 30%,
- (e) that it has a molecular weight distribution (Mw/Mn) determined by gel permeation chromatography (GPC) of not higher than 3,
- (f) that it has a B-value calculated by the equation (I)

$$B=P_{OE}/(2P_O \cdot P_E) \quad (I)$$

of 1–1.4, wherein $P_E$ and $P_O$ represent each a mole fraction of the ethylene structural unit and that of the structural unit of α-olefin in the ethylene/α-olefin random copolymer (B-1) before the modification, respectively, and $P_{OE}$ denotes a proportion of number of the ethylene/α-olefin alternating chain units relative to the total number of dyads, determined from $^{13}$C-NMR spectrum, and
- (g) that the ratio of the intrinsic viscosity [η] of the ethylene/α-olefin random copolymer (B-1) versus the intrinsic viscosity [η]$_{blank}$ of an ethylene/propylene linear random copolymer, both determined in decalin at 135° C., i.e. gη*=[η]/[η]$_{blank}$, is in excess of 0.95, wherein the said ethylene/propylene linear random copolymer has a content of the structural unit of ethylene of 70 mole % and a weight-average molecular weight (Mw) determined by light scattering method identical to that of the ethylene/α-olefin random copolymer (B-1).

(4) The polyester resin composition as defined in the above (3), wherein the linear ethylene/α-olefin random copolymer which is the component (B-1) is obtained by subjecting ethylene and an α-olefin of 6–20 carbon atoms to a random copolymerization in the presence of a metallocene-based catalyst comprising a metallocene represented by the general formula (1) or (2) given below:

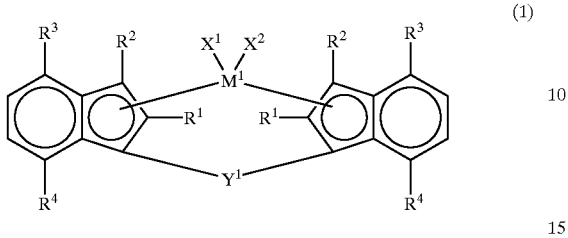

(1)

in which

M¹ stands for a transition metal of Group 4 of the periodic table,

R¹ and R² denote each, independently of each other, hydrogen atom, a halogen atom, a hydrocarbyl of 1–20 carbon atoms, a halogenated hydrocarbyl of 1–20 carbon atoms, a silicium-containing group, an oxygen-containing group, a sulfur-containing group, a nitrogen-containing group or a phosphorus-containing group, R³ and R⁴ denote each, independently of each other, an alkyl of 1–20 carbon atoms, X¹ and X² represent each, independently of each other, hydrogen atom, a halogen atom, a hydrocarbyl of 1–20 carbon atoms, a halogenated hydrocarbyl of 1–20 carbon atoms, an oxygen-containing group or a sulfur-containing group and Y¹ stands for a divalent hydrocarbon group of 1–20 carbon atoms, a divalent halogenated hydrocarbon group of 1–20 carbon atoms, a silicium-containing divalent group, a germanium-containing divalent group, a tin-containing divalent group, —O—, —CO—, —S—, —SO—, —SO₂—, —NR⁷—, —P(R⁷)—, —P(O)(R⁷)—, —BR⁷— or —AlR⁷—, wherein R⁷ denotes hydrogen atom, a halogen atom a hydrocarbyl of 1–20 carbon atoms or a halogenated hydrocarbyl of 1–20 carbon atoms; or

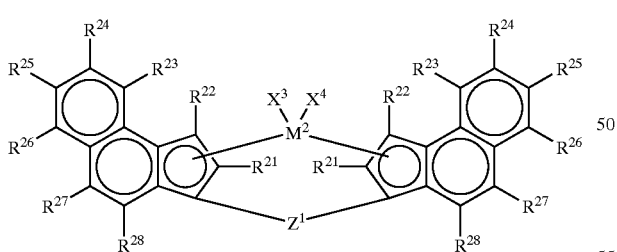

(2)

in which

M² stands for a transition metal of Group 4 of the periodic table,

R²¹ denotes, independently of one another, hydrogen atom, a halogen atom, an alkyl of 1–10 carbon atoms which may be substituted by one or more halogens, an aryl of 6–10 carbon atoms which may be substituted by one or more halogens, —NR₂, —SR, —OSiR₃, —SiR₃ or —PR₂, wherein R stands for a halogen atom, an alkyl of 1–10 carbon atoms or an aryl of 6–10 carbon atoms, R²² to R²⁸ may each, independently of each other, be the same as the above R²¹, or neighboring ones among R²² to R²⁸ may form, together with carbon atom(s) bound thereto, an aromatic or an aliphatic ring, X³ and X⁴ represent each, independently of each other, hydrogen atom, a halogen atom, OH group, an alkyl of 1–10 carbon atoms, an alkoxy of 1–10 carbon atoms, an aryl of 6–10 carbon atoms, an aryloxy of 6–10 carbon atoms, an alkenyl of 2–10 carbon atoms, an aralkyl of 7–40 carbon atoms, an alkaryl of 7–40 carbon atoms or an arylalkenyl of 8–40 carbon atoms and Z¹ represents

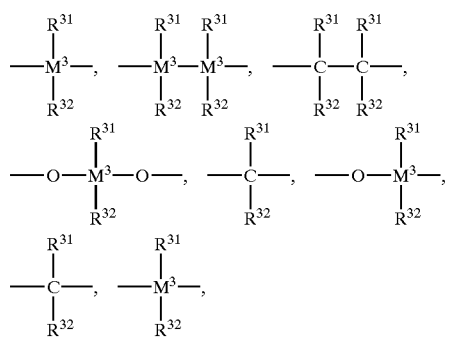

=BR³¹, =AlR³¹, —Ge—, —Sn—, —O—, —S—, =SO, =SO₂, =NR³¹, =CO, =PR³¹ or =P(O)R³¹, wherein R³¹ and R³² denote each, independently of each other, hydrogen atom, a halogen atom, an alkyl of 1–10 carbon atoms, a fluoroalkyl of 1–10 carbon atoms, an aryl of 6–10 carbon atoms, a fluoroaryl of 6–10 carbon atoms, an alkoxy of 1–10 carbon atoms, an alkenyl of 2–10 carbon atoms, an aralkyl of 7–40 carbon atoms, an aralkenyl of 8–40 carbon atoms or an alkaryl of 7–40 carbon atoms or R³¹ and R³² may form, together with carbon atom(s) bound thereto, a ring and M³ stands for silicium, germanium or tin.

(5) The polyester resin composition as defined in the above (1) or (2), wherein the ethylene/α-olefin random copolymer (B-1) is a long chain branched ethylene/α-olefin random copolymer which has, before the graft modification, the features (c) that it has a glass transition temperature (Tg) of not higher than minus 50° C., (d) that it has a degree of crystallinity determined by X-ray diffraction method of lower than 30%, (e) that it has a molecular weight distribution (Mw/Mn) determined by gel permeation chromatography (GPC) of not higher than 3, (f) that it has a B-value calculated by the equation (I), $$B = P_{OE}/(2P_O \cdot P_E) \quad (I),$$

of 1–1.4, wherein $P_E$ and $P_O$ represent each a mole fraction of the ethylene structural unit and that of the structural unit of α-olefin in the ethylene/α-olefin random copolymer (B-1) before the modification, respectively, and $P_{OE}$ denotes a proportion of number of the ethylene/α-olefin alternating chain units relative to the total number of dyads, determined from ¹³C-NMR spectrum, and (h) that the ratio of the intrinsic viscosity [η] of the ethylene/α-olefin random copolymer (B-1) versus the intrinsic viscosity $[\eta]_{blank}$ of an ethylene/propylene linear random copolymer, both determined in decalin at 135° C., i.e. $g\eta^*=[\eta]/[\eta]_{blank}$, is 0.2–0.95, wherein the said linear ethylene/propylene random copolymer has a content of the structural unit of ethylene of 70 mole % and a weight-average molecular weight (Mw) determined by light scattering method identical to that of the ethylene/α-olefin random copolymer (B-1).

(6) The polyester resin composition as defined in the above (5), wherein the long chain branched ethylene/α-olefin random copolymer which is the component (B-1) is obtained by subjecting ethylene and the α-olefin of 6–20 carbon atoms to a random copolymerization in the presence of a metallocene-based catalyst comprising a metallocene represented by the general formula (3) given below:

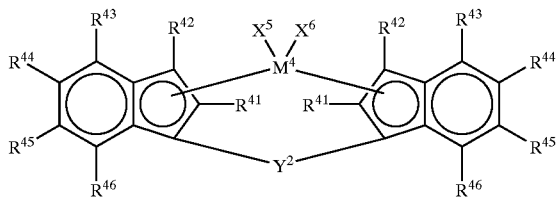

(3)

in which
M⁴ stands for a transition metal of Group 4 of the periodic table,
$R^{41}$ denotes, independently of one another, a hydrocarbyl of 1–6 carbon atoms,
$R^{42}$, $R^{44}$, $R^{45}$ and $R^{48}$ denote each, independently of each other, hydrogen atom, a halogen atom or a hydrocarbyl of 1–6 carbon atoms,
$R^{43}$ denotes, independently of one another, an aryl of 6–16 carbon atoms which may be substituted by one or more halogen atoms or by one or more hydrocarbyl or organosilyl groups of 1–20 carbon atoms,
$X^5$ and $X^6$ represent each, independently of each other, hydrogen atom, a halogen atom, a hydrocarbyl of 1–20 carbon atoms, a halogenated hydrocarbyl of 1–20 carbon atoms, an oxygen-containing group or a sulfur-containing group and
$Y^2$ stands for a divalent hydrocarbon group of 1–20 carbon atoms, a halogenated divalent hydrocarbon group of 1–20 carbon atoms, a silicium-containing divalent group, a germanium-containing divalent group, —O—, —CO—, —S—, —SO—, —SO₂—, —NR⁴⁷—, —P(R⁴⁷)—, —P—(O)(R⁴⁷)—, —BR⁴⁷— or —AlR⁴⁷, wherein $R^{47}$ denotes hydrogen atom, a halogen atom, a hydrocarbyl of 1–20 carbon atoms or a halogenated hydrocarbyl of 1–20 carbon atoms.

As the polyester resin (A) to be incorporated according to the present invention, known polyester resins having molecular weights enough to form formed articles may be used without any limitation and usually a thermoplastic polyester resin having a melt flow rate (ASTM D 1238, 250° C., 325 g load) of 0.01–100 g/10 min., preferably 0.05–50 g/10 min., more preferably 0.1–30 g/10 min., is used.

For the polyester resin (A), there may be enumerated, for example, thermoplastic polyester resins obtained from
dihydroxy compounds selected from aliphatic glycols, such as ethylene glycol, propylene glycol, 1,4-butanediol, neopentyl glycol and hexamethylene glycol; cycloaliphatic glycols, such as cyclohexane dimethanol; aromatic dihydroxy compounds, such as bisphenols; and two or more of them and dicarboxylic acids selected from aromatic dicarboxylic acids, such as terephthalic acid, isophthalic acid and 2,6-naphthalene dicarboxylic acid; aliphatic dicarboxylic acids, such as oxalic acid, succinic acid, adipic acid, sebacic acid and undecanedicarboxylic acid; cycloaliphatic dicarboxylic acids, such as hexahydroterephthalic acid etc.; and two or more of them.

Such thermoplastic polyester resins may be modified by small amount of, for example, polyhydroxy compounds or polycarboxylic acids of tri- or higher valencies, such as a triole or a tricarboxylic acid, so long as the resins reveal thermoplastic property.

Concrete examples of the polyester resin (A) include polyethylene terephthalate (PET), polybutylene terephthalate (PBT) and polyethylene isophthalate/terephthalate copolymer. Among them, polyethylene terephthalate and polybutylene terephthalate are preferred, since they are superior in the mechanical properties and in the moldability.

The graft-modified ethylene/α-olefin random copolymer (B) according to the present invention is one in which an unsaturated carboxylic acid or its derivative (B-2) is grafted onto an ethylene/α-olefin random copolymer (B-1), (designated in the following as the non-graft-modified ethylene/α-olefin random copolymer) constituted of a structural unit derived from ethylene (ethylene unit) and a structural unit derived from an α-olefin of 6–20 carbon atoms, preferably, 6–12 carbon atoms (α-olefin unit).

As the α-olefin of 6–20 carbon atoms, there may be exemplified 1-hexene, 4-methyl-1-pentene, 1-heptene, 1-octene, 1-decene, 1-dodecene and 1-hexadodecene. Among them, preference is given to α-olefins of 6–12 carbon atoms, such as 1-hexene and 1-octene, with particular preference to 1-hexene and 1-octene.

The content of the ethylene unit in the non-graft-modified ethylene/α-olefin random copolymer (B-1) may be in the range from 75 to 94 mole %, preferably from 78 to 92 mole %, while the content of the α-olefin unit of 6–20 carbon atoms may be in the range from 6 to 25 mole %, preferably from 8 to 22 mole %. If the content of the α-olefin unit is in the above range, a graft-modified ethylene/α-olefin random copolymer (B) exhibiting superior moldability together with easy handling performance due to better flexural property can be obtained. Using such a graft-modified ethylene/α-olefin random copolymer (B), a polyester resin composition capable of bringing about molded articles superior in the low-temperature impact resistance, in the stiffness and in the fracture toughness can be obtained.

The non-graft-modified ethylene/α-olefin random copolymer (B-1) has a melt flow rate (MFR: ASTM D 1238, 190° C., 2.16 kg load) in the range from 0.1 to 50 g/10 min., preferably from 0.3 to 20 g/10 min. If MFR is in the above range, the graft-modified ethylene/α-olefin random copolymer (B) exhibits a better performance for being blended with the polyester resin (A). Using such a graft-modified ethylene/α-olefin random copolymer (B), a polyester resin composition superior in the moldability can be obtained.

The non-graft-modified ethylene/α-olefin random copolymer (B-1) may favorably have a glass transition temperature (Tg), determined by differential scanning calorimeter (DSC), of not higher than minus 50° C., preferably in the range from −50° C. to −80° C. If the glass transition temperature (Tg) is not higher than minus 50° C., a polyester resin composition capable of bringing about molded articles superior in the low-temperature impact resistance can be obtained. The non-graft-modified ethylene/α-olefin random copolymer (B-1) may favorably have a degree of crystallinity, as determined by X-ray diffraction method, of lower than 30%, preferably lower than 20%. If the degree of crystallinity is lower than 30%, a polyester resin composition superior in the impact resistance can be obtained.

The non-graft-modified ethylene/α-olefin copolymer. (B-1) may favorably have a molecular weight distribution (Mw/Mn) of not higher than 3, preferably in the range from 1 to 2.5. The Mw/Mn is a value calculated from the weight-average molecular weight (Mw) and the number-average molecular weight (Mn) converted by polystyrene determined using monodisperse polystyrenes as the standard substance by gel permeation chromatography (GPC). As the column, for example, TSK GEL GMH-HT or TSK GEL GMH-HTL (both trademarks, made by Tosoh K.K.) may be employed. If the Mw/Mn value is lower than 3, a polyester resin composition superior in the impact resistance can be obtained.

The non-graft-modified ethylene/α-olefin random copolymer (B-1) may favorably have a B-value calculated by the equation (I), i.e. $B=P_{OE}/(2P_O \cdot P_E)$, in the range from 1 to 1.4, preferqably from 1 to 1.2. The B-value is a parameter indicating the random distribution of comonomer chains, namely, the state of distribution of the structural units derived from the comonomers in the copolymer chain.

The values of $P_{OE}$, $P_O$ and $P_E$ in the equation (I) can be determined according to the teachings of G. J. Ray, Macromolecules, 10, 773 (1977), J. C. Randall, Macromolecules, 15, 353 (1982) and K. Kimura, Polymer, 25, 441 (1984) from the $^{13}$C-NMR spectrum obtained in the manner as follows:

Thus, in a test tube of 10 mm φ, about 200 mg of the non-graft-modified ethylene/α-olefin random copolymer (B-1) are uniformly dissolved in 1 ml of hexachlorobutadiene to prepare a sample and $^{13}$C-NMR spectrum of this sample is taken under the detection condition given below.

Detection condition:

Detection temperature: 120° C.

Detection frequency: 20.05 MHz

Spectrum width: 1,500 Hz

Filtering width: 1,500 Hz

Pulse repetition period: 4.2 sec.

Pulse width: 7 μsec.

Number of integrations: 2,000–5,000

The B-value obtained by the equation (I) equals to 2, when the two comonomers are disposed alternately with each other in the non-graft-modified ethylene/α-olefin random copolymer (B-1), and equals to zero, when the non-graft-modified copolymer is a complete block-copolymer in which the two comonomers are polymerized in a completely separated form.

If the B-value is in the above-mentioned range, a polyester resin composition capable of bringing about molded articles superior in the low-temperature impact resistance can be obtained.

The non-graft-modified ethylene/α-olefin random copolymer (B-1) may favorably have a ratio of the intrinsic viscosity [η] of the ethylene/α-olefin random copolymer (B-1) to the intrinsic viscosity $[η]_{blank}$ of the corresponding linear ethylene/propylene random copolymer, both determined in decalin at 135° C., i.e. $gη^*=[η]/[η]_{blank}$ (See Japanese Patent Publication Hei 3-14045 B) exceeding over 0.95, preferably in the range from 0.97 to 1.0. The corresponding linear ethylene/propylene random copolymer mentioned above has a content of the ethylene unit of 70 mole % and a weight-average molecular weight (Mw) determined by light scattering method identical to that of the ethylene/α-olefin random copolymer (B-1). The ethylene/α-olefin random copolymer (B-1) having a gη* value in the above range is a linear random ethylene/α-olefin copolymer.

The non-graft-modified ethylene/α-olefin random copolymer (B-1) may also favorably have a value for gη*, namely, $[η]/[η]_{blank}$, in the range from 0.2 to 0.94, preferably from 0.3 to 0.92. The ethylene/α-olefin random copolymer (B-1) having a gη* value in the above range is a long chain-branched random copolymer of ethylene/α-olefin.

As the ethylene/α-olefin random copolymer (B-1), those in which the content of the α-olefin of 6–20 carbon atoms and the melt flow rate are each in the above-mentioned range may be employed, wherein preference is given to those in which at least one of the material properties among glass transition temperature (Tg), degree of crystallinity, molecular weight distribution (Mw/Mn), B-value and gη* [namely, $[η]/[η]_{blank}$] is in the above-mentioned range, with particular preference to linear or long chain-branched ethylene/α-olefin random copolymers in which all these material properties are in the above-mentioned ranges.

The linear chain ethylene/α-olefin random copolymer, in which the glass transition temperature, the degree of crystallinity, the Mw/Mn value and the B-value are each in the above-mentioned range and which has a gη* value exceeding 0.95 may favorable be a copolymer produced by subjecting ethylene and an α-olefin of 6–20 carbon atoms to random copolymerization in the presence of a catalyst based on metallocene comprising a metallocene represented by the formula (1) or (2) given previously, as will be detailed afterwards.

The long chain-branched ethylene/α-olefin random copolymer in which the glass transition temperature, the degree of crystallinity, the Mw/Mn value and the B-value are each in the above-mentioned range and which has a gη* value in the range from 0.2 to 0.95 may favorable be a copolymer produced by subjecting ethylene and an α-olefin of 6–20 carbon atoms to random copolymerization in the presence of a catalyst based on metallocene containing a metallocene represented by the formula (3) given previously, as will be detailed afterwards.

While the non-graft-modified ethylene/α-olefin random copolymer (B-1) can be produced by a method known per se using a Ziegler catalyst or using the catalyst based on metallocene, it is preferable to produce it using the metallocene-based catalyst. The metallocene-based catalyst may favorably be composed of a metallocene (p) of a transition metal (a transition metal compound) and an organoaluminum-oxy compound (q) and/or an ionizing ionic compound (r).

For the metallocene (p), those of transition metals selected from Group 4 of the periodic table of elements with Group 1 to Group 18 (long form) according to the Revised IUPAC Inorganic Nomenclature (1989) and, concretely, those expressed by the following general formula (4)

$$ML_x \quad (4)$$

may be recited, in which M denotes a transition metal selected from the Group 4 of the periodic table and may concretely be zirconium, titanium or hafnium and x is the valence of the transition metal.

L represents a ligand coordinating to the transition metal, wherein at least one of the ligands L has a cyclopentadienyl skeleton, wherin the ligand L having the cyclopentadienyl skeleton may comprise substituent group.

As the ligand having the cyclopentadienyl skeleton, there may be recited such groups as alkyl- or cycloalkyl-substituted cyclopentadienyl, such as for example, cyclopentadienyl, methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl; and further, indenyl, 4,5,6,7-tetrahydroindenyl and fluorenyl.

These groups may further be substituted by, for example, halogen atom(s) and trialkylsilyl group(s).

Among them, alkyl-substituted cyclopentadienyls are especially preferred.

In case where the metallocene (p) represented by the general formula (4) has two or more groups having the cyclopentadienyl skeleton as the ligands, two of them having the cyclopentadienyl skeleton may be bound together through, for example, an alkylene, such as ethylene or propylene; a substituted alkylene, such as isopropylidene or diphenylmethylene; silylene; or a substituted silylene, such as dimethylsilylene, diphenylsilylene or methylphenylsilylene.

For Ls other than those having the cyclopentadienyl skeleton, there may be enumerated, for example, hydrocarbon groups of 1–12 carbon atoms, alkoxy groups, aryloxy groups, sulfo-containing groups (—$SO_3R^1$), halogen atoms or hydrogen atom (in which $R^1$ denotes an alkyl, a halogen-substituted alkyl, an aryl or a halogen- or alkyl-substituted aryl).

As the hydrocarbon group having 1–12 carbon atoms, there may be recited such groups as alkyl, cycloalkyl, aryl and aralkyl and, more concretely, alkyl groups, such as methyl, ethyl, n-propyl, isopropyl, n-butyl, isobutyl, sec-butyl, t-butyl, pentyl, hexyl, octyl, decyl and dodecyl;

cycloalkyl groups, such as cyclopentyl and cyclohexyl;

aryl groups, such as phenyl and tolyl; and aralkyl groups, such as benzyl and neophyl.

As the alkoxy group, there may be exemplified methoxy, ethoxy, n-propoxy, isopropoxy, n-butoxy, isobutoxy, sec-butoxy, t-butoxy, pentoxy, hexoxy and octoxy.

As the aryloxy group, there may be recited, for example, phenoxy or the like.

As the sulfo-containing group (—$SO_3R^1$), there may be recited, for example, methanesulfonato, p-toluenesulfonato, trifluoromethanesulfonato and p-chlorobenzenesulfonato.

As the halogen atom, fluorine, chlorine, bromine and iodine are recited.

When the valence of the transition metal is 4, metallocene (p) represented by the general formula (4) may be represented, more concretely, by the general formula (5):

$$R^2_k R^3_l R^4_m R^5_n M \qquad (5)$$

in which M is a transition metal same as that given in the genral formula (4), and is preferably zirconium or titanium, $R^2$ represents a group (ligand) having a cyclopentadienyl skeleton, $R^3$, $R^4$ and $R^5$ represent each, independently of each other, a group having a cyclopentadienyl skeleton or a group same as the L other than the ligand having a cyclopentadienyl skeleton in the general formula (4). k is an integer of 1 or higher, wherein k+l+m+n=4.

Examples of the metallocene (p) which contains at least two ligands having each a cyclopentadienyl skeleton and in which M is zirconium are given below: Bis(cyclopentadienyl)zirconium monochloride monohydride, bis(cyclopentadienyl)zirconium dichloride, bis(cyclopentadienyl)methylzirconium monochloride, bis(cyclopentadienyl)zirconium phenoxymonochloride, bis(methylcyclopentadienyl)zirconium dichloride, bis(ethylcyclopentadienyl)zirconium dichloride, bis(n-propylcyclopentadienyl)zirconium dichloride, bis(isopropylcyclopentadienyl)zirconium dichloride, bis(cyclopentadienyl)zirconium bis(methanesulfonate), bis(cyclopentadienyl)zirconium bis(p-toluenesulfonate), bis(1,3-dimethylcyclopentadienyl)zirconium dichloride, bis(1-methyl-3-ethylcyclopentadienyl)zirconium dichloride and bis(1-methyl-3-propylcyclopentadienyl)zirconium dichloride.

According to the present invention, it is also possible to use a metallocene (p) in which the 1,3-substituted cyclopentadienyl as given above is replaced by a 1,2-substituted cyclopentadienyl.

There may also be exemplified metallocenes (p) of bridged structure in which at least two of $R^2$, $R^3$, $R^4$ and $R^5$, for example, $R^2$ and $R^3$ are each the group (ligand) having a cyclopentadienyl skeleton and such at least two groups are bound each other through, for example, an alkylene, substituted alkylene, silylene or substituted silylene. Here, $R^4$ and $R^5$ stand, independently of each other, for the L other than that having a cyclopentadienyl skeleton as explained in the general formula (4).

As the metallocene (p) of such a bridged structure, there may be enumerated, for example, ethylenebis(indenyl)dimethylzirconium, ethylenebis(indenyl)zirconium dichloride and ethylenebis(indenyl)zirconiumbis(trifluoromethanesulfonate).

According to the present invention, it is also possible to use a metallocene represented by the general formula (1) as the metallocene (p).

As concrete examples of the transition metal of Group 4 of the periodic table represented by $M^1$ in the general formula (1), there may be recited titanium, zirconium and hafnium.

As concrete examples of the atom or group represented by $R^1$ or $R^2$ in the general formula (1), there may be recited a halogen atom, such as fluorine, chlorine, bromine or iodine;

a hydrocarbon group having 1–20 carbon atoms, for example, an alkyl group, such as methyl, ethyl, propyl, butyl, hexyl or cyclohexyl; an alkenyl group, such as vinyl, propenyl or cyclohexenyl; an aralkyl group, such as benzyl, phenylethyl or phenylpropyl; or an aryl group, such as phenyl, tolyl, dimethylphenyl, naphthyl or methylnaphthyl;

a halogenated hydrocarbon group in which the hydrocarbon group mentioned above is substituted by halogen atom (s);

a silicium-containing group, such as for example, a hydrocarbon-monosubstituted silyl group, such as methylsilyl or phenylsilyl; a hydrocarbon-disubstituted silyl, such as dimethylsilyl or diphenylsilyl; a hydrocarbon-trisubstituted silyl, such as trimethylsilyl or triethylsilyl;

a silyl ether of a hydrocarbon-substituted silyl, such as trimethyl silyl ether;

a silicium-substituted alkyl group, such as trimethylsilylmethyl; or a silicium-substituted aryl group, such as trimethylsilylphenyl;

an oxygen-containing group, for example, hydroxy; an alkoxy, such as methoxy or ethoxy; an aryloxy, such as phenoxy or methylphenoxy; or an arylalkoxy, such as phenylmethoxy or phenylethoxy;

a sulfur-containing group in which the oxygen in the above oxygen-containing group is replaced by sulfur;

a nitrogen-containing group, for example, amino or an alkylamino, such as methylamino or dimethylamino; or an aryl- or alkylarylamino, such as phenylamino or methylphenylamino; or a phosphorus-containing group, for example, a phosphino group, such as dimethylphosphino.

Among them, preference is given for $R^1$ being a hydrocarbon group, in particular, a hydrocarbon group having 1–3 carbon atoms, such as methyl, ethyl or propyl. For $R^2$, preference is given for hydrogen atom or a hydrocarbon group, especially hydrogen atom or a hydrocarbon group having 1–3 carbon atoms, such as methyl, ethyl or propyl.

As concrete examples of the alkyl group of 1–20 carbon atoms represented by $R^3$ or $R^4$, those same as the alkyl groups exemplified for $R^1$ as above.

As the concrete examples of the halogen atoms, the hydrocarbon groups of 1–20 carbon atoms, the halogenated hydrocarbon groups of 1–20 carbon atoms and the oxygen-containing groups represented by $X^1$ and $X^2$, those same as $R^1$ given above may be recited. For the sulfur-containing group, there may be exemplified, in addition to the groups same as $R^1$ given above, sulfonates, such as methyl sulfonate, trifluoromethane sulfonate, phenyl sulfonate, benzyl sulfonate, p-toluene sulfonate, trimethylbenzene sulfonate, triisobutylbenzene sulfonate, p-chlorobenzene sulfonate and pentafluorobenzene sulfonate; and sulfinates, such as methyl sulfinate, phenyl sulfinate, benzene sulfinate, p-toluene sulfinate, trimethylbenzene sulfinate and pentafluorobenzene sulfinate.

As concrete examples of $Y^1$, there may be recited alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and divalent hydrocarbon groups of 1–20 carbon atoms, such as arylalkylenes, such as diphenylmethylene and diphenyl-1,2-ethylene;

halogenated hydrocarbon groups in which the divalent hydrocarbon groups of 1–20 carbon atoms given above are halogenated, such as chloromethylene;

divalent silicium-containig groups, for example, alkylsilylenes, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene, di(p-chlorophenyl) silylene; alkylarylsilylenes; arylsilylenes; alkyldisilylenes, such as tetramethyl-1,2-disilylene and tetraphenyl-1,2-disilylene; alkylaryldisilylenes; and aryldisilyelenes;

divalent germanium-containing groups in which the silicium atom in the above-mentioned divalent silicium-containing groups is replaced by germanium; and divalent tin-containing groups in which silicium atom in the above-mentioned divalent silicium-containing groups is replaced with tin.

$R^7$ stands for a halogen atom which is the same as $R^1$ given above, for a hydrocarbon group of 1–20 carbon atoms or for a halogenated hydrocarbon group of 1–20 carbon atoms.

Among them, preference is given for silicium-containing divalent groups, for germanium-containing divalent groups and for tin-containing divalent groups with further preference to silicium-containing divalent groups, among which, in particular, alkylsilylenes, alkylarylsilylenes and arylsilylenes are preferred.

According to the present invention, it is also possible to use metallocenes represented by the general formula (2) for the metallocene (p).

Concrete examples of a transition metal of Group 4 of the periodic table represented by $M^2$ include titanium, zirconium and hafnium.

As concrete examples of the atoms and groups represented by $R^{21}$, there may be enumerated, for example, halogen atoms, such as fluorine, chlorine, bromine and iodine;

alkyl groups of 1–10 carbon atoms, such as methyl, ethyl, propyl, butyl, hexyl and cyclohexyl;

aryl groups of 6–10 carbon atoms, such as phenyl, tolyl, dimethylphenyl, naphthyl and methylnaphthyl; and halogenated alkyls and halogenated aryls in which halogen atom(s) are substituted on the above-mentioned alkyl groups and aryl groups.

Further, in the groups of —$NR_2$, —SR, —$OSiR_3$, —$SiR_3$ and —$PR_2$, those in which R stands for a halogen atom, an alkyl of 1–10 carbon atoms or an aryl of 6–10 carbon atoms may be exemplified.

For concrete examples of the atoms and groups represented by $R^{22}$ to $R^{28}$, the same ones as those given for $R^{21}$ are enumerated.

$X^3$ and $X^4$ represent each hydrogen atom; a halogen atom, preferably chlorine atom; OH group; an alkyl of 1–10 carbon atoms, preferably 1–3 carbon atoms; an alkoxy of 1–10 carbon atoms, preferably 1–3 carbon atoms; an aryl of 6–10 carbon atoms, preferably 6–8 carbon atoms; an aryloxy of 6–10 carbon atoms, preferably 6–8 carbon atoms; an alkenyl of 2–10 carbon atoms, preferably 2–4 carbon atoms; an aralkyl of 7–40 carbon atoms, preferably 7–10 carbon atoms; an alkaryl of 7–40 carbon atoms, preferably 7–12 carbon atoms; or an arylalkenyl of 8–40 carbon atoms, preferably 8–12 carbon atoms. $X^3$ and $X^4$ may be either identical with or different from each other.

$Z^1$ represents the followings:

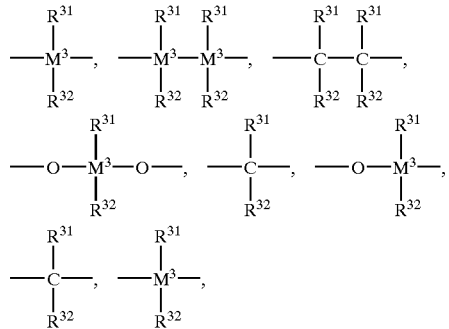

=$BR^{31}$, =$AlR^{31}$, —Ge—, —Sn—, —O—, —S—, =SO, =$SO_2$, =$NR^{31}$, =CO, =$PR^{31}$ or =$P(O)R^{31}$, wherein $R^{31}$ and $R^{32}$ denote each hydrogen atom; a halogen atom; an alkyl of 1–10 carbon atoms, preferably 1–4 carbon atoms and more preferably methyl; a fluoroalkyl of 1–10 carbon atoms, preferably —$CF_3$; an aryl of 6–10 carbon atoms, preferably 6–8 carbon atoms; a fluoroaryl of 6–10 carbon atoms, preferably pentafluorophenyl; an alkoxy of 1–10 carbon atoms, preferably 1–4 carbon atoms, especially preferably methoxy; an alkenyl of 2–10 carbon atoms, preferably 2–4 carbon atoms; an aralkyl of 7–40 carbon atoms, preferably 7–10 carbon atoms; an aralkenyl of 8–40 carbon atoms, preferably 8–12 carbon atoms; or an alkaryl of 7–40 carbon atoms, preferably 7–12 carbon atoms. $R^{31}$ and $R^{32}$ may form, together with the carbon atoms bonded thereto, a ring. $R^{31}$ and $R^{32}$ may be either identical with or different from each other.

$M^3$ stands for silicium, germanium or tin, preferably silicium or germanium.

$Z^1$ may favorably be $=CR^{31}R^{32}$, $=SiR^{31}R^{32}$, $=GeR^{31}R^{32}$, —O—, —S—, =SO, $=PR^{31}$ or $=P(O)R^{31}$.

According to the present invention, metallocenes represented by the general formula (3) may also be used for the metallocene (p).

As concrete examples of the transition metal of Group 4 of the periodic table represented by $M^4$ in the general formula (3), titanium, zirconium, hafnium and the like are recited.

As concrete examples of the hydrocabyl of 1–6 carbon atoms represented by $R^{41}$ in the general formula (3), there may be enumerated alkyls, such as methyl, ethyl, propyl, butyl, hexyl and cyclohexyl; alkenyls, such as vinyl, propenyl and cyclohexenyl; and aryls, such as phenyl and the so on.

As concrete examples of the halogen atoms and the hydrocarbyls of 1–6 carbon atoms represented by $R^{42}$, $R^{44}$, $R^{45}$ and $R^{46}$, there may be enumerated halogen atoms, such as fluorine, chlorine, bromine and iodine; and hydrocarbyls as those for $R^{41}$.

As concrete examples of the aryls of 6–16 carbon atoms represented by $R^{43}$, there may be recited phenyl, tolyl, dimethylphenyl, trimethylphenyl, ethylphenyl, propylphenyl, biphenyl, naphthyl, methylnaphthyl, anthracenyl and phenanthryl. These aryls may be substituted by those halogen atoms, hydrocarbyls of 1–20 carbon atoms and silicium-containing groups (organosilyls), which are exemplified for $R^1$ of the general formula (1).

As concrete examples of the halogen atoms and the groups represented by $X^5$ and $X^6$, those which are exemplified for $R^1$ of the general formula (1) may be enumerated.

For the sulfur-containing groups, there may be exemplified, in addition to the above-mentioned groups for $R^1$, sulfonates, such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinates, such as methylsulfinate, phenylsulfinate, benzenesulfinate, p-toluenesulfinate, trimethylbenzenesulfinate and pentafluorobenzenesulfinate.

Concrete examples for $Y^2$ include divalent hydrocarbyl of 1–20 carbon atoms, for example, alkylenes, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylenes, such as diphenylmethylene and diphenyl-1,2-ethylene;

halogenated hydrocarbyls, in which the above-mentioned divalent hydrocarbyls of 1–20 carbon atoms are halogenated, such as chloromethylene etc.;

divalent silicium-containing groups, for example, alkyl silylenes, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene, and di(p-chlorophenyl) silylene; alkylarylsilylenes; arylsilylenes; alkyldisilylenes; such as tetramethyl-1,2-disilylene and tetraphenyl-1,2-disilylene; alkylaryldisilylenes; and aryldisilylenes;

divalent germanium-containing groups in which the silicium in the above-mentioned divalent silicium-containing groups is replaced by germanium; and divalent tin-containing groups in which the silicium in the above-mentioned divalent silicium-containing groups is replaced by tin.

$R^{47}$ stands, in the same way as $R^1$ of the general formula (1), for a halogen atom, hydrocarbon group of 1–20 carbon atoms or a halogenated hydrocarbon group of 1–20 carbon atoms.

Among them, preference is given for silicium-containing divalent groups, for germanium-containing divalent groups and for tin-containing divalent groups with further preference to silicium-containing divalent groups, among which, in particular, alkylsilylenes, alkylarylsilylenes and arylsilylenes are preferred.

According to the present invention, the metallocene (p) may be used either alone or in a combination of two or more kinds. It is possible to use the metallocene (p) under dilution in a hydrocarbon, in a halogenated hydrocarbon or in others. It is also possible to use the metallocene (p) under contact with a granular carrier compound.

For the carrier compound supporting the metallocene (p), inorganic carrier compounds, such as, $SiO_2$, $Al_2O_3$, $B_2O_3$, $MgO$, $ZrO_2$, $CaO$, $TiO_2$, $ZnO$, $SnO_2$, $BaO$ and $ThO$; and resins of, for example, polyethylene, polypropylene, poly-1-butene, poly-4-methyl-1-pentene and styrene/divinylbenzene copolymer, may be employed. These carrier compounds may be used either alone or in a combination of two or more kinds.

Now, the description is directed to the organo-aluminum-oxy compound (q) and to the ionizing ionic compound (r) to be used for preparing the metallocene-based catalyst.

The organoaluminum-oxy compound (q) to be used according to the present invention may be an aluminoxane known per se or may be an organoaluminum-oxy compound insoluble in benzene.

Such known aluminoxanes may concretely be represented by the following general formula (6) or (7)

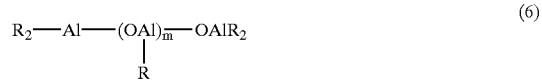

(6)

(7)

wherein R in the general formulae (6) and (7) represents a hydrocarbon group, such as, methyl, ethyl, propyl or butyl, preferably methyl or ethyl, with particular preference to methyl, m is an integer of 2 or greater, preferably 5–40.

In the general formulae (6) and (7), the aluminoxane may be constituted of mixed alkyloxyaluminum units composed of an alkyloxyaluminum unit represented by the general formula $\{OAl(R^1)\}$ and an alkyloxyaluminum unit represented by the general formula $\{OAl(R^2)\}$, wherein $R^1$ and $R^2$ may each be exemplified by the hydrocarbon group same as R and wherein $R^1$ is different from $R^2$.

The organoaluminum-oxy compound (q) may contain a small amount of organometallic component(s) of metal(s) other than aluminum.

As the ionizing ionic compound (r), which may sometimes be called "ionic ionizing compound" or "ionic compound", there may be exemplified Lewis acids, ionic compounds, boranes and carboranes.

As the Lewis acids, those which are represented by $BR_3$, wherein R stands for fluorine or a phenyl group which may have substituent group(s), such as, fluorine, methyl and trifluoromethyl, may be recited. Concrete examples of the Lewis acid include trifluoroboron, triphenylboron, tris(4-fluorophenyl)boron, tris(3,5-di-fluorophenyl)boron, tris(4-fluoromethylphenyl)boron, tris(pentafluorophenyl)boron, tris(p-tolyl)boron, tris-(o-tolyl)boron and tris(3,5-dimethylphenyl)boron.

As the ionic compounds mentioned above, there may be enumerated, for example, trialkyl-substituted ammonium salts, N,N-dialkylanilinium salts, dialkylammonium salts and triarylphosphonium salts. For the trialkyl-substituted ammonium salt as the ionic compound, there may be exemplified triethylammonium tetra(phenyl)boron, tripropylammonium tetra(phenyl)boron and tri(n-butyl)ammonium tetra (phenyl)boron. For the dialkylammonium salt as the ionic compound, there may be exemplified di(1-propyl) ammonium tetra(pentafluorophenyl)boron and dicyclohexylammonium tetra(phenyl)boron.

As the ionic compounds mentioned above, there may also be exemplified triphenylcarbenium tetrakis (pentafluorophenyl) borate, N,N-dimethylanilinium tetrakis (pentafluorophenyl) borate and ferrocenium tetra (pentafluorophenyl) borate.

As the boranes mentioned above, there may be exemplified salts of metal borane anions, such as, decaborane(14); bis[tri(n-butyl)ammonium]nonaborate, bis[tri(n-butyl) ammonium]decaborate and bis[tri-(n-butyl)ammonium]bis (dodecahydridododecaborate) nickelate(III).

As the carboranes mentioned above, there may be exemplified salts of metal carborane anions, such as, 4-carbanonaborane(14), 1,3-dicarbanonaborane(13), bis-[tri (n-butyl)ammonium] bis(undecahydrido-7-carbaundecaborate]nickelate(IV).

The ionizing ionic compound (r) may either be used alone or in a combination of two or more kinds. The organoaluminum-oxy compound (q) and the ionizing ionic compound (r) may be used in a form supported on the carrier compound mentioned previously.

On preparing the metallocene-based catalyst, known organoaluminum compound(s) may be used together with the organoaluminum-oxy compounds (q) described above and/or the ionizing ionic compound (r).

By co-polymerizing ethylene with the α-olefin in the presence of a catalyst formed from the metallocene (p) as given above and the organoaluminum-oxy compound (q) and/or the ionizing ionic compound (r) usually in a liquid phase, the ethylene/α-olefin random copolymer (B-1) is obtained. Here, a hydrocarbon solvent is used in general, while it is permissible to use the α-olefin as the solvent.

The copolymerization of ethylene with the α-olefin may be effected in any method of a batch-wise or a continuous way. In case the copolymerization is effected in a batch-wise method, the catalyst may be used at a concentration as given below:

The metallocene-based catalyst constituted of the metallocene (p) and the organoaluminum-oxy compound (q) or the ionizing ionic compound (r) may be used usually in such an amount that the concentration of the metellocene (p) in the polymerization system will be 0.00005–1 mmol/liter of the polymerization space, preferably 0.0001–0.5 mmol/liter. The organo-aluminum-oxy compound (q) may be supplied to the polymerization system at such a rate that the mole ratio of aluminum atom to the transition metal in the metallocene (p) (Al/transition metal) in the polymerization system will be 1–10,000, preferably 10–5,000.

For the case of the ionizing ionic compound (r), it may be supplied to the polymerization system at such a rate that the mole ratio of the ionizing ionic compound (r) to the metallocene (p) [ionizing ionic compound (r)/metallocene (p)] in the polymerization system will be 0.5–20, preferably 1–10.

In case the organoaluminum compound is used, it may be used usually in such an amount that 0–5 mmol/liter of the polymerization space, preferably 0–2 mmol/liter, is reached.

The copolymerization may usually be effected under a condition of a temperature of −20 to +150° C., preferably 0 to 120° C., more preferably 0 to 100° C., and a pressure from exceeding 0 up to 8 MPa (gauge pressure), preferably from exceeding 0 up to 5 MPa (gauge pressure). On performing the copolymerization, a molecular weight regulator, such as hydrogen, may be employed.

When ethylene is co-polymerized with the α-olefin in the manner as above, the ethylene/α-olefin random copolymer (B-1) is obtained usually as a polymerization liquor containing it. The polymerization liquor is treated by ordinary method, whereby the ethylene/α-olefin random copolymer (B-1) is obtained.

As the unsaturated carboxylic acid or the derivative thereof (B-2) to be grafted onto the non-modified ethylene/α-olefin random copolymer (B-1), there may be exemplified unsaturated carboxylic acids, such as acrylic acid, maleic acid, fumaric acid, tetrahydrophthalic acid, itaconic acid, citraconic acid, crotonic acid, isocrotonic acid and NADIC acid (trademark, endocis-bicyclo[2.2.1]hept-5-en-2,3-dicarboxylic acid); and derivatives of these unsaturated carboxylic acids, such as acid halides, amides, imides, acid anhydrides and esters. As concrete examples of the derivatives, there may be recited malenyl chloride, maleimide, maleic anhydride, citraconic anhydride, monomethyl maleate, dimethyl maleate, glycidyl maleate and so on. Among them, unsaturated dicarboxylic acids and acid anhydrides thereof are preferable, with particular preference to maleic acid and NADIC acid (trademark) and acid anhydrides of them.

The grafting amount of the unsaturated carboxylic acid or the derivative thereof may be in the range from 0.01 to 10% by weight, preferably from 0.1 to 5% by weight, per 100% by weight of the non-modified ethylene/α-olefin random copolymer (B-1). If the grafting amount is in the above range, the graft-modified ethylene/α-olefin random copolymer (B) will be superior in the dispersibility in the polyester resin composition together with superior heat stability without revealing coloration of the resin upon melting. When such a graft-modified ethylene/α-olefin random copolymer (B) is used, a polyester resin composition capable of bringing about molded articles superior in the mechanical strength can be obtained.

There is no special limitation as to the site of grafting of the unsaturated carboxylic acid or the derivative thereof onto the non-modified ethylene/α-olefin random copolymer (B-1) and it is enough only that the unsaturated carboxylic acid or the derivative thereof (B-2) is bound to any voluntary carbon atom of the ethylene/α-olefin random copolymer (B-1) constituting the graft-modified ethylene/α-olefin random copolymer (B).

The graft-modified ethylene/α-olefin random copolymer (B) can be produced by methods known per se, for example, by the following methods:

(1) A method in which the non-modified ethylene/α-olefin random copolymer (B-1) is melted and the unsaturated carboxylic acid (B-2) is added thereto to effect the graft-copolymerization.

(2) A method in which the non-modified ethylene/α-olefin random copolymer (B-1) is dissolved in a solvent and the unsaturated carboxylic acid etc. (B-2) is added thereto to effect the graft-copolymerization.

In any method, it is preferable to effect the graft-copolymerization in the presence of a radical-initiator, in order to carry out efficiently the graft-copolymerization of the grafting monomer, such as the unsaturated carboxylic acid or so on. As the radical-initiator, organic peroxides, azo compounds and so on may be employed.

As concrete examples of the radical-initiator, there may be recited organic peroxides, such as benzoyl peroxide, dichlorobenzoyl peroxide, dicumyl peroxide, di-tert-butyl peroxide, 2,5-dimethyl-2,5-di(peroxide benzoate)hexyne-3, 1,4-bis(tert-butylperoxyisopropyl)benzene, lauroyl peroxide, tert-butyl peracetate, 2,5-dimethyl-2,5-di(tert-butylperoxido)hexyne-3, 2,5-dimethyl-2,5-di(tert-butylperoxido)hexane, tert-butyl perbenzoate, tert-butylperphenyl acetate, tert-butyl perisobutyrate, tert-butyl per-sec-octoate, tert-butyl perpivalate, cumyl perpivalate and tert-butyl perdiethyl acetate; and azo compounds, such as azobisisobutyronitrile and dimethyl azoisobutyrate. Among them, preference is given to dialkyl peroxides, such as dicumyl peroxide, di-tert-butyl peroxide, 2,5-dimethyl-2,5-di(tert-butylperoxy)hexyne-3, 2,5-dimethyl-2,5-di-(tert-butylperoxy)hexane and 1,4-bis(tert-butylperoxyisopropyl)benzene.

It is favorable to use the radical-initiator usually in an amount of 0.001–1 part by weight, preferably 0.005–0.5 part by weight, more preferably 0.01–0.3 part by weight, per 100 parts by weight of the non-modified ethylene/α-olefin random copolymer (B-1).

The reaction temperature in the grafting reaction using a radical initiator or in the grafting reaction without using radical initiator may favorably be settled in general at 60–350° C., preferably at 150–300° C.

The composition according to the present invention contains the above-mentioned graft-modified ethylene/α-olefin random copolymer (B) in a proportion of 5–200 parts by weight, preferably 10–100 parts by weight, more preferably 10–60 parts by weight, per 100 parts by weight of the polyester resin (A). If the graft-modified ethylene/α-olefin random copolymer (B) is in the above range, a polyester resin composition which is superior in the moldability and is capable of bringing about molded articles superior in the low-temperature impact resistance, in the stiffness and in the fracture toughness at room temperature can be obtained.

In the polyester resin composition according to the present invention, there may be compounded, if necessary, for example, polymers other than the above components (A) and (B), additives, such as antioxidant, UV absorber, light-protecting agent, heat stabilizer based on phosphite, peroxide decomposing agent, basic assistant stabilizer, nuclea magnifying agent, plasticizer, lubricant, antistatic agent, fire retardant, pigment, dyestuff and filler, within the range not obstructing the purpose of the present invention, in addition to the polyester resin (A) and the graft-midified ethylene/α-olefin random copolymer (B).

As the filler, there may be exemplified carbon black, asbestos, talcum, silica and silica-alumina.

The polyester resin composition according to the present invention can be prepared by melt-blending the polyester resin (A), the graft-modified ethylene/α-olefin random copolymer (B) and other ingredients to be compounded on requirement by methods known per se. Thus, the polyester resin composition according to the present invention can be prepared by mixing the constituent components on, for example, Henschel mixer, V-shaped blender, tumbler mixer or ribbon blender, followed by melt-kneading on, for example, single screw extruder, multiscrew extruder, kneader or Banbury's mixer. The additives, for example, antioxidant etc., may be admixed, if necessary, on any voluntary stage. Use of a device superior in the kneading performance, such as a multiscrew extruder, kneader or Banbury's mixer is favorable, since thereby a high quality polyester resin composition in which each component is dispersed more uniformly is obtained.

The polyester resin composition according to the present invention can be used widely by forming it into voluntary shapes in application fields in which polyesters have been used in the past. It can be used, in particular, in application fields where impact resisntance, low-temperature impact resistance, stiffness and toughness are required. Concretely, there may be recited, for example, vessels, films, bottles, packaging materials for foods, fibers, machinery parts, parts for electric and electronic instruments, automobile parts and other industrial parts. For the forming, techniques known per se, for example, melt-molding techniques, such as injection molding, extrusion molding, compression molding and foaming molding, can be employed.

Due to the incorporation of certain specific graft-modified ethylene/α-olefin random copolymer in a polyester resin in a specific proportion, the polyester resin composition according to the present invention is superior in the impact resistance, in particular, in the low-temperature impact resistance, with superiorities in the stiffness and in the fracture toughness.

THE BEST MODE FOR EMBODYING THE INVENTION

Below, the present invention is described concretely by way of Examples. However, the present invention is not restricted by such Examples.

EXAMPLE 1

<<Production of Maleic Anhydride-graft-modified α-olefin Random Copolymer>>

As the non-modified ethylene/α-olefin random copolymer (B-1), an ethylene/1-octene random copolymer was used, which was obtained by copolymerization using a metallocene-based catalyst containing bis(1,3-dimethylcyclopentadienyl)zirconium chloride and which had the material properties as given below:

Content of 1-octene unit: 10 mole %

MFR (ASTM D 1238, 190° C., 2.16 kg load: 3.8 g/10 min.

Glass transition temperature determined by DSC: –57° C.

Degree of crystallinity determined by X-ray diffraction: 16%

Mw/Mn determined by GPC: 2.2

B-value calculated by the equation (I): 1.0 gη*: 1.0

Density: 885 kg/m$^3$

Form of polymer chain: linear 10 kg of the above ethylene/1-octene random copolymer were blended with a solution prepared by dissolving preliminarily 100 grams of maleic anhydride and 6 grams of di-tert-butyl peroxide in 100 grams of acetone in a Henschel mixer. Then, the resulting blend was introduced into a single screw extruder with a screw diameter of 40 mm and L/D=26 via the hopper and was extruded at a resin temperature of 260° C. at an extrusion rate of 6 kg/hr into a strand, which was cooled by water and was then pelletized to obtain an ethylene/1-octene random copolymer graft-modified by maleic anhydride.

After extracting out unreacted maleic anhydride from the resulting graft-modified ethylene/1-octene random copolymer with acetone, the amount of maleic anhydride grafted in the graft-modified ethylene/1-octene random copolymer was detected, whereby the grafted amount was found to be 0.93% by weight.

<<Production of Thermoplastic Polyester Resin Composition>>

100 parts by weight of a polybutylene terephthalate [1401-X06, trademark, a product of Toray Industries, Inc., MFR (250° C., 325 g load)=5 g/10 min. (abbreviated in the following to PBT)] were mixed with 10 parts by weight of the above maleic anhydride-graft-modified ethylene/1-octene random copolymer of the form of pellet given above on a Henschel mixer to prepare a dry blend. Then, the dry blend was supplied to a double screw extruder (L/D=40, 3 mmφ) settled at 255° C. to produce pellets of a thermoplastic resin composition.

The resulting pellets of the thermoplastic polyester resin composition were dried for one full day at 120° C., whereupon an injection molding was carried out under the conditions given below to prepare test specimens for testing material properties.

<<Assessments of Material Properties>>

Subsequently, assessments of material properties of the thermoplastic polyester resin composition were carried out by the methods given below. The results are given in Table 2.

Tensile Test

Using a test specimen having a thickness of ⅛ inch, yield strength, stress at breaking point and elongation at breaking point were determined according to ASTM D 638. The conditioning of the state of the test specimen was performed in a dry state at a temperature of 23° C. for two days.

Bending Test

Using a test specimen having a thickness of ⅛ inch, flexural modulus, flexural yield stress were determined according to ASTM D 790. The conditioning of the state of the test specimen was performed in a dry state at a temperature of 23° C. for two days.

Izod Impact Test

Using a test specimen having a thickness of ⅛ inch, notched Izod impact strengths at 23° C. and at −40° C. were determined according to ASTM D 256. The conditioning of the state of the test specimen was performed in a dry state at a temperature of 23° C. for two days.

EXAMPLES 2 TO 4 and

Comparative Examples 1 to 4

Procedures of Example 1 were pursued except that the maleic anhydride-modified copolymers (B) given in Table 1 were employed in the place of the maleic anhydride-modified ethylene/1-octene random copolymer used in Example 1. The results are recited in Table 2.

TABLE 1

| | Example | | | | Comparative Example | | | |
|---|---|---|---|---|---|---|---|---|
| | 1 | 2 | 3 | 4 | 1 | 2 | 3 | 4 |
| Non-modified copolymer | | | | | | | | |
| Content of 1-octene (mole %) | 10 | 14 | 16 | 14 | — | — | — | — |
| Content of 1-butene (mole %) | — | — | — | — | 11 | 17 | 19 | — |
| Content of propylene (mole %) | — | — | — | — | — | — | — | 19 |
| MFR (190° C.) (g/10 min.) | 3.8 | 3.9 | 4.0 | 4.0 | 3.6 | 3.7 | 3.6 | 0.5 |
| Degree of crystallinity (%) | 16 | 7 | 0 | 7 | 12 | 3 | 0 | 8 |
| Glass transition temp. (° C.) | −57 | −60 | −66 | −58 | −50 | −58 | −65 | −58 |
| Mw/Mn — | 2.2 | 2.1 | 2.2 | 2.2 | 2.1 | 2.0 | 2.1 | 2.0 |
| B-value — | 1.0 | 1.0 | 1.0 | 1.0 | 1.0 | 1.0 | 1.0 | 1.0 |
| gη* — | 1.0 | 1.0 | 1.0 | 0.88 | 1.0 | 1.0 | 1.0 | 1.0 |
| Density (kg/m³) | 885 | 870 | 860 | 870 | 885 | 870 | 860 | 870 |
| Form of molecular chain | linear | linear | linear | b.l.c. | linear | linear | linear | linear |
| Modified copolymer (B) | | | | | | | | |
| Grafting monomer | MAH | MAH | MAH | MAH | MAH | MAH | MAH | MAH |
| Amount charged (wt. %) | 1.0 | 1.0 | 1.0 | 1.0 | 1.0 | 1.0 | 1.0 | 1.0 |
| Amount grafted (wt. %) | 0.93 | 0.94 | 0.92 | 0.93 | 0.95 | 0.92 | 0.92 | 0.92 | b.l.c.: branched long chain
MAH: maleic anhydride

TABLE 2

| | Example | | | | Comparative Example | | | |
|---|---|---|---|---|---|---|---|---|
| | 1 | 2 | 3 | 4 | 1 | 2 | 3 | 4 |
| PBT (A) (wt. %) | 80 | 80 | 80 | 80 | 80 | 80 | 80 | 80 |
| Modified copolymer (B) (wt. %) | 20 | 20 | 20 | 20 | 20 | 20 | 20 | 20 |
| Tensile yield strength (MPa) | 37 | 36 | 35 | 36 | 37 | 36 | 34 | 33 |
| Tensile breaking stress (MPa) | 38 | 30 | 28 | 29 | 29 | 27 | 25 | 25 |
| Breaking elongation (%) | 450 | 220 | 150 | 240 | 230 | 110 | 70 | 80 |
| Flexural yield stress (MPa) | 54 | 53 | 54 | 53 | 53 | 53 | 50 | 50 |
| Initial flexural modulus (MPa) | 1620 | 1600 | 1550 | 1580 | 1600 | 1580 | 1500 | 1450 |
| Izod impact test at 23° C. (J/m) | 660 | 680 | 720 | 680 | 620 | 660 | 710 | 710 |
| Izod impact test at −40° C. (J/m) | 71 | 78 | 95 | 75 | 62 | 72 | 90 | 88 |

PBT: Polybutylene terephthalate

INDUSTRIAL APPLICABILITY

As described above, the polyester resin composition according to the present invention can be used in application fields where polyesters have been employed in the past, such as for example, vessels, films, bottles, packaging materials for foods, fibers, machinery parts, parts for electric and electronic instruments, parts for automobile and parts for other industrial utilities, since it is superior in the impact resistance, low-temperature impact resistance, stiffness and toughness.

What is claimed is:

1. A polyester resin composition, comprising (A) a polyester resin and (B) a graft-modified ethylene/α-olefin random copolymer in which an unsaturated carboxylic acid or a derivative thereof (B-2) is grafted onto an ethylene/α-olefin random copolymer (B-1) comprising a structural unit of ethylene and a structural unit of an α-olefin of 6–20 carbon atoms, in a proportion of 5–200 parts by weight of (B) per 100 parts by weight of (A), wherein the grafted amount of the unsaturated carboxylic acid or the derivative thereof (B-2) is 0.01–10% by weight and wherein the ethylene/α-olefin random copolymer (B-1) has, before the graft-modification, the features (a) that the content of the structural unit of the α-olefin of 6–20 carbon atoms is 6–25 mole %, (b) that the melt flow rate (ASTM D 1238, 190° C., 2.16 kg load) is 0.1–50 g/10 min., (c) that it has a glass transition temperature (Tg) of not higher than minus 50° C., (d) that it has a degree of crystallinity determined by X-ray diffraction method of lower than 30%, (e) that it has a molecular weight distribution (Mw/Mn) determined by gel permeation chromatography (GPC) of not higher than 3, (f) that it has a B-value calculated by the equation (I)

$$B = P_{OE}/(2P_O \cdot P_E) \qquad (1)$$

of 1–1.4, wherein $P_E$ and $P_O$ represent each a mole fraction of the ethylene structural unit and that of the structural unit of α-olefin in the ethylene/α-olefin random copolymer (B-1) before the modification, respectively, and $P_{OE}$ denotes a proportion of number of the ethylene/α-olefin alternating chain units relative to the total number of dyads, determined from $^{13}$C-NMR spectrum, and (g) that the ratio of the intrinsic viscosity [η] of the ethylene/α-olefin random copolymer (B-1) versus the intrinsic viscosity $[η]_{blank}$ of a linear ethylene/propylene random copolymer, both determined in decalin at 135° C., i.e. $gη^* = [η]/[η]_{blank}$, is in the range of 0.97–1.0, wherein the said ethylene/propylene linear random copolymer has a content of the structural unit of ethylene of 70 mole % and a weight-average molecular weight (Mw) determined by light scattering method identical to that of the ethylene/α-olefin random copolymer (B-1).

2. The polyester resin composition as claimed in claim 1, wherein the linear ethylene/α-olefin random copolymer which is the component (B-1) is obtained by subjecting ethylene and an α-olefin of 6–20 carbon atoms to a random copolymerization in the presence of a metallocene-based catalyst comprising a metallocene represented by the general formula (1) or (2) given below:

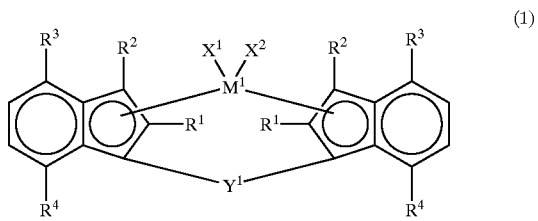

in which $M^1$ stands for a transition metal of Group 4 of the periodic table, $R^1$ and $R^2$ denote each, independently of each other, hydrogen atom, a halogen atom, a hydrocarbyl of 1–20 carbon atoms, a halogenated hydrocarbyl of 1–20 carbon atoms, a silicium-containing group, an oxygen-containing group, a sulfur-containing group, a nitrogen-containing group or a phosphorus-containing group, $R^3$ and $R^4$ denote each, independently of each other, an alkyl of 1–20 carbon atoms, $X^1$ and $X^2$ represent each, independently of each other, hydrogen atom, a halogen atom, a hydrocarbyl of 1–20 carbon atoms, a halogenated hydrocarbyl of 1–20 carbon atoms, an oxygen-containing group or a sulfur-containing group and $Y^1$ stands for a divalent hydrocarbon group of 1–20 carbon atoms, a divalent halogenated hydrocarbon group of 1–20 carbon atoms, a silicium-containing divalent group, a germanium-containing divalent group, a tin-containing divalent group, —O—, —CO—, —S—, —SO—, —SO$_2$—, —NR$^7$—, —P(R$^7$)—, —P(O)(R$^7$)—, —BR$^7$— or —AlR$^7$, wherein $R^7$ denotes hydrogen atom, a halogen atom, a hydrocarbyl of 1–20 carbon atoms or a halogenated hydrocarbyl of 1–20 carbon atoms; or

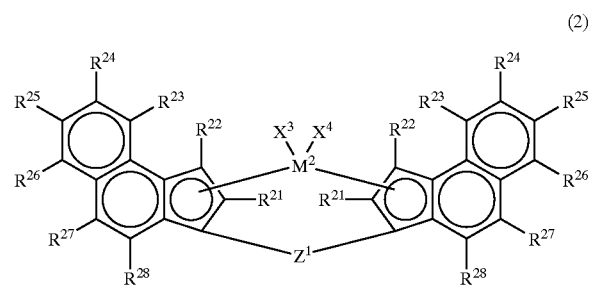

in which $M^2$ stands for a transition metal of Group 4 of the periodic table, $R^{21}$ denotes, independently of one another, hydrogen atom, a halogen atom, an alkyl of 1–10 carbon atoms which may be substituted by one or more halogens, an aryl of 6–10 carbon atoms which may be substituted by one or more halogens, —NR$_2$, —SR, —OSiR$_3$, —SiR$_3$ or —PR$_2$, wherein R stands for a halogen atom, an alkyl of 1–10 carbon atoms or an aryl of 6–10 carbon atoms, $R^{22}$ to $R^{28}$ may each, independently of each other, be the same as the above $R^{21}$, or neighboring ones among $R^{22}$ to $R^{28}$ may form, together with carbon atom(s) bound thereto, an aromatic or an aliphatic ring, $X^3$ and $X^4$ represent each, independently of each other, hydrogen atom, a halogen atom, OH group, an alkyl of 1–10 carbon atoms, an alkoxy of 1–10 carbon atoms, an aryl of 6–10 carbon atoms, an aryloxy of 6–10 carbon atoms, an alkenyl of 2–10 carbon atoms, an aralkyl of 7–40 carbon atoms, an alkaryl of 7–40 carbon atoms or an arylalkenyl of 8–40 carbon atoms and $Z^1$ represents

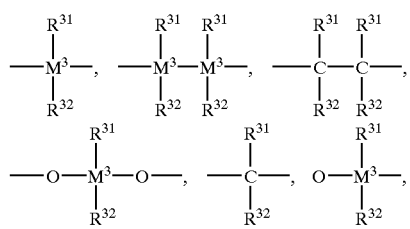

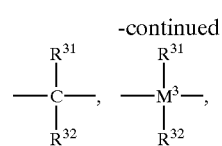

$=BR^{31}$, $=AlR^{31}$, —Ge—, —Sn—, —O—, —S—, $=SO$, $=SO_2$, $=NR^{31}$, $=CO$, $=PR^{31}$ or $=P(O)R^{31}$, wherein $R^{31}$ and $R^{32}$ denote each, independently of each other, hydrogen atom, a halogen atom, an alkyl of 1–10 carbon atoms, a fluoroalkyl of 1–10 carbon atoms, an aryl of 6–10 carbon atoms, a fluoroaryl of 6–10 carbon atoms, an alkoxy of 1–10 carbon atoms, an alkenyl of 2–10 carbon atoms, an aralkyl of 7–40 carbon atoms, an aralkenyl of 8–40 carbon atoms or an alkaryl of 7–40 carbon atoms or $R^{31}$ and $R^{32}$ may form, together with carbon atom(s) bound thereto, a ring and $M^3$ stands for silicium, germanium or tin.

\* \* \* \* \*